United States Patent [19]

Kwak

[11] 4,290,885
[45] Sep. 22, 1981

[54] AERATION DEVICE

[76] Inventor: Dochan Kwak, 1935 Farragut Way, San Jose, Calif. 95133

[21] Appl. No.: 16,890

[22] Filed: Mar. 2, 1979

Related U.S. Application Data

[63] Continuation of Ser. No. 863,068, Dec. 22, 1977, abandoned.

[51] Int. Cl.³ ............................ C02F 3/16; B28B 1/26
[52] U.S. Cl. ...................................... 210/197; 210/219; 210/220; 261/36 R; 261/87; 261/93
[58] Field of Search ........... 210/4, 7, 14, 15, 219–221, 210/194, 197, 205, 207, 208; 261/36 R, 87, 91, 93, DIG. 75

[56] References Cited

U.S. PATENT DOCUMENTS

| 2,144,386 | 1/1939 | Nordell | 210/14 |
| 2,530,814 | 11/1950 | DeBecze et al. | 261/93 |
| 2,802,647 | 8/1957 | Bolton | 259/8 |
| 2,928,661 | 3/1960 | McLaren | 261/87 |
| 3,218,042 | 11/1965 | Ciabattari | 259/95 |
| 3,341,450 | 9/1967 | Ciabattari et al. | 210/63 R |
| 3,497,185 | 2/1970 | Divelt | 261/36 R |
| 3,780,998 | 12/1973 | Botsch | 261/91 |
| 3,865,721 | 2/1975 | Kaelin | 210/219 |
| 4,021,349 | 5/1977 | Kaelin | 210/219 |
| 4,117,048 | 9/1978 | Stockner et al. | 261/87 |

FOREIGN PATENT DOCUMENTS

| 2350467 | 4/1975 | Fed. Rep. of Germany | 216/91 |
| 439139 | of 1972 | Switzerland | 210/219 |
| 430070 | 11/1974 | U.S.S.R. | 210/219 |
| 537955 | 1/1977 | U.S.S.R. | 210/219 |

Primary Examiner—Benoit Castel

[57] ABSTRACT

An efficient apparatus related in general to introducing gas into a body of liquid and more particularly to aerating wastewater contained in an activation basin by means of interacting surface agitation and gas entrainment.

4 Claims, 5 Drawing Figures

AERATION DEVICE

CROSS-REFERENCE TO RELATED APPLICATION

This is a continuation of Ser. No. 863,068 filed Dec. 22, 1977, now abandoned.

BACKGROUND OF THE INVENTION

My invention may be described in connection with aeration in wastewater treatment plant, but it is to be understood that the invention applies to gas-liquid contacting processes in general.

Surface aerators are usually rotated by a central shaft. Structurally the two widely applied surface aeration apparatus are (1) propeller type which have blades with various pitch extending radially from a center shaft and (2) so-called turbine type aerators which have curved blades on conical walls such as the one described in U.S. Pat. No. 3,576,316. These surface aeration devices attain gas-liquid contacting by continuously agitating and pumping liquid near liquid surface in a wastewater aeration tank. Hydrodynamically these surface aeration devices typically create surface jet layer flowing radially outward from these aerators. This inherently turbulent surface jet provides quick surface renewal mechanism for gas-liquid contacting, thus achieving mass transfer of the gas into the liquid body. However, due to the speed of the jet, a lump of fluid remains near the surface very short time and quickly flow into the liquid under the surface carrying a great portion of the kinetic energy, which is used for mixing and suspending solids in wastewater. This portion of the kinetic energy is rather well distributed throughout the tank and subsequently dissipated in the form of internal energy without contributing much to the gas-liquid mass transfer.

One of the most important requirements in aerating wastewater is the continuous suspension of solids in an aeration basin. To achieve this suspension, surface aerators have to provide sufficient energy of agitation. Considering the hydrodynamic flow pattern generated by typical surface aerators, the bottom scouring action, thus the ability to keep solids suspended, is limited by the nature of the recirculating turbulent flow in the particular basin. Consequently the input energy per liquid volume and geometry of the basin play a dominant role in solids suspension as well as gas-liquid mass transfer. In other words the overall effectiveness of the surface aeration methods developed so far is dominated by the nature of flow pattern which is dependent on the particularity of a basin geometry. Therefore instead of hoping to achieve drastic improvement in overall performance by merely manipulating certain portion of existing surface aerators construction, a new improved method and device have to be developed based on novel ideas with cost engineering in mind.

When the aeration basin is relatively deep, surface aerators can generate only weak bottom scouring action which cannot prevent the sedimentation of solids on the bottom. To prevent this problem, bottom mixing devices have been added. Typically an additional impeller is attached to the center shaft extended deep into the aeration basin. This arrangement not only complicates the mechanical structure but also requires additional power consumption. Moreover bottom mixing devices may change the circulating flow pattern such a way that surface renewal for gas-liquid contacting becomes much less efficient resulting in reduction in aeration efficiency.

Methods have been considered, such as described in U.S. Pat. No. 3,827,679, to solve the bottom mixing problem with surface aeration system as well as to obtain high efficiency in aeration by inserting a gas under pressure underneath the bottom mixer. However the introduction of a gas under pressure requires gas compressors which consume additional energy in addition to an increase in initial capital cost. These additional equipments, such as compressor and drive units, require more maintenance effort. Therefore attaching a bottom mixing impeller merely to solve sedimentation problem is not very desirable.

From a dynamic point of view, the turbulent energy requirement of a fluid for proper mixing is related to physical properties of the fluid, turbulence length scale created by a particular agitating device and turbulent intensity which has dominant effect on rate of decay of kinetic energy. The turbulent intensity can be interpreted as fluctuating flow velocity and will affect the mass transfer of gas into liquid on gas-liquid interface. An energy efficient aeration method has to incorporate all these factors to produce the best mass transfer mechanism.

It is essential to balance these physical phenomena to produce most energy economical aeration as well as to produce favorable flow configuration for good mixing and solid suspension. Moreover, for practical applications, maximum mechanical simplicity and minimum maintenance in operation is a very important factor. The present invention is based on the above considerations, and it's salient features are briefly explained below.

As described above, mixing energy is present in an aeration basin in the form of turbulent eddies which constitutes a very significant part of total energy input into the basin. Since, in surface aeration only, gas entrainment is mostly confined near the surface, a large amount of turbulent energy inside the basin is not efficiently utilized in aeration. The present invention, on the other hand, makes use of this energy in aerating the liquid by providing gas bubbles distributed throughout the basin, thus achieving high gas-liquid mass transfer efficiency.

To entrain gas bubbles, the following system is designed based on the principle of maximum mechanical simplicity and practicality. An impeller, mounted on a single shaft with a surface aerator, pumps liquid downward with such a speed that the pressure in the down flow liquid region becomes low enough to suck gas from the gas space through at least a duct. Then the entrained gas and liquid form two-phase flow which is pushed down through a guide tube and is discharged near the bottom of the basin. Subsequently this two-phase flow forms wall jet along the bottom floor and provides a very strong bottom scouring action. This favorable flow configuration along the bottom makes solids suspended, and also allows us to make aeration basin relatively deep which is often desirable in many practical situations. Moreover, the mechanical simplicity in the construction of surface aerator and down pumping impeller combination requires almost no additional maintenance in operation to the surface aeration only. In essence the most novel features of the present invention come from the concept of interaction mechanism of surface aeration and self-entrained gas bubbles, and the simplistic device which carries out this mechanism into effect.

OBJECT OF THE INVENTION

It is, therefore, an object of the present invention to provide a highly efficient apparatus for introducing a gas into a liquid with good bottom mixing by interacting surface agitation and entrained gas bubbles in a liquid basin.

BRIEF DESCRIPTION OF THE SEVERAL VIEWS OF DRAWINGS

The invention will become more readily apparent from the following description with reference to the accompanying drawings, in which FIGS. 1, 3 and 4 illustrate each an embodiment in vertical section, FIG. 2 is an enlarged view of hollow shaft and FIG. 5 is a top view of cover with gas entrainment tubes.

DETAILED DESCRIPTION OF THE PREFERRED EMBODIMENT

Figure 1:
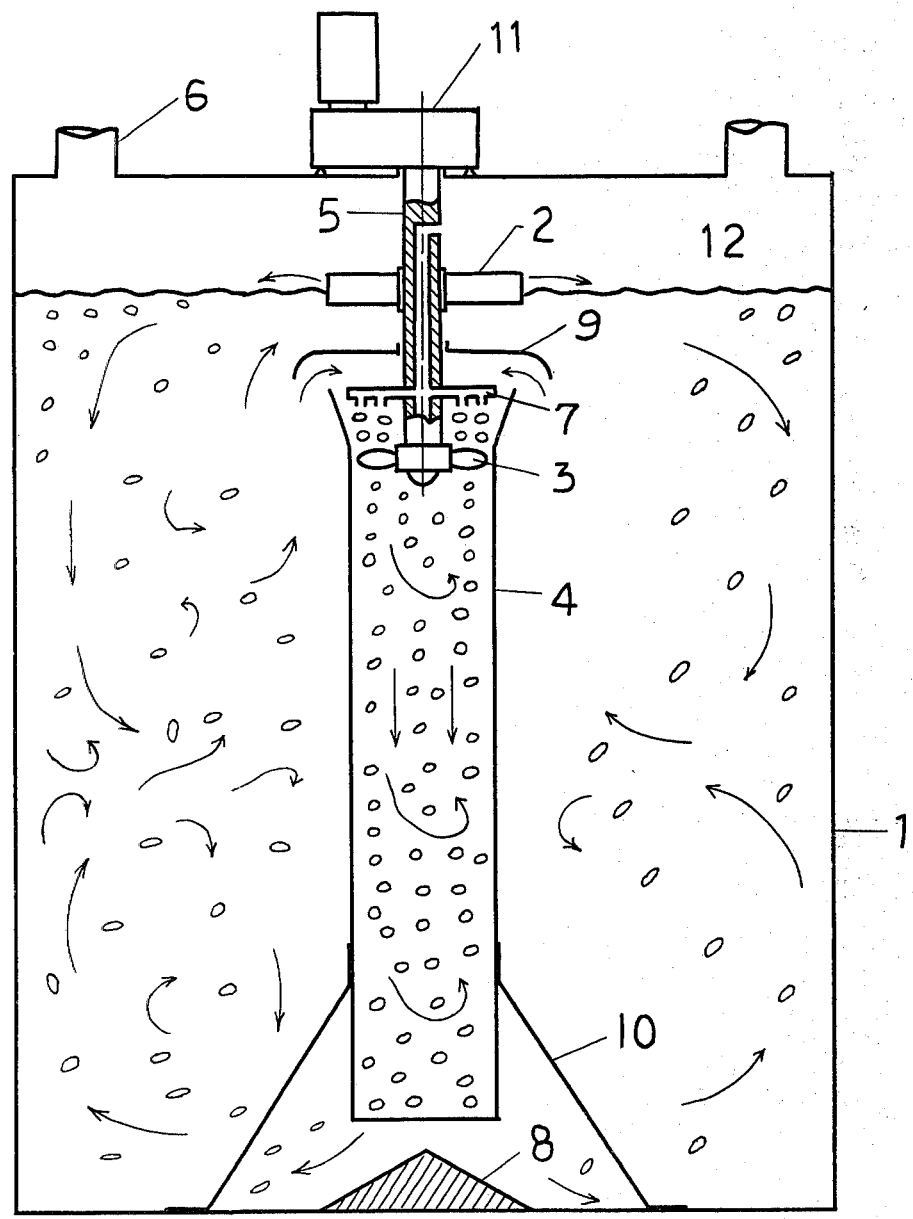

With reference to FIG. 1, the basin 1 is filled with a liquid to be treated such as wastewater with upper space 12 filled with air or oxygen enriched gas mixture ventilated through holes 6. A surface aerator 2, which may be pitched bladed propeller type or so-called turbine type, is attached to the shaft 5 which is driven by a power supply unit 11. The down pumping impeller 3 is inside the guide tube 4 and is mounted together with the surface aerator 2 on a common shaft 5. The cover 9 to the guide tube 4 is located between the surface aerator 2 and the top end of guide tube 4 so that the flow is properly guided into the inlet region at the bottom of the surface aerator 2 and into the inlet region of the guide tube 4 and thus on top of the down pumping impeller 3. The shaft 5 is hollow and it is constructed so that the gas above the liquid surface can flow through the hollow center portion of the shaft down into the downward liquid flow region in the guide tube 4. The arm 7 may be extended as shown for efficient gas entrainment and uniform radial distribution. Near the discharge end of the guide tube 4 is located a bottom cone 8 on the floor of the basin 1. The assembly of the guide tube 4 and the cover 9 may be supported by the frame 10 or secured to the top structure of the basin 1.

Figure 2:
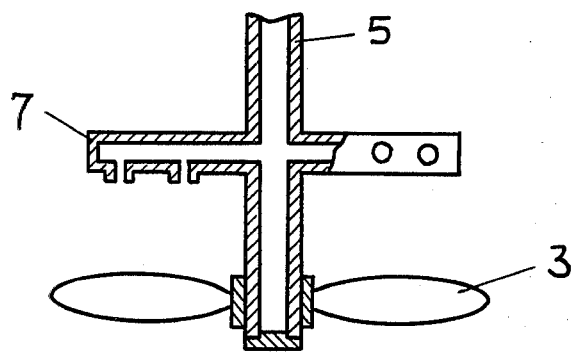

In FIG. 2, an enlarged section of the gas entraining hollow shaft 5 is shown with extended arm 7. The gas holes may be located at various angular positions as shown on arm 7 by down facing holes on left and side holes on right.

Figure 3:
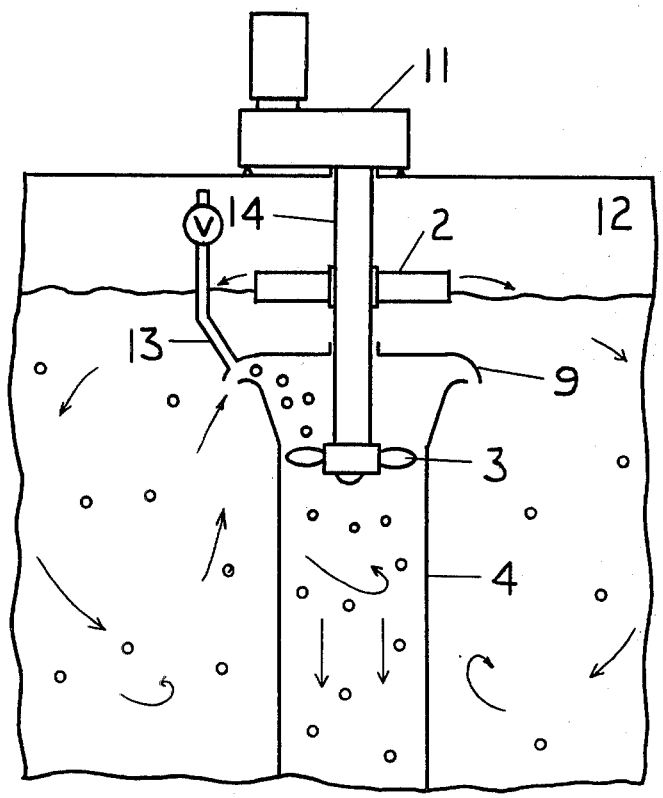

The embodiment shown in FIG. 3 comprises all the same components as in FIG. 1 except that the shaft 14 is solid and that at least one gas entraining tube 13 is provided. The tube 13 is placed on the cover 9 in the narrow neck section where the velocity of the flow into the guide tube 4 is designed to be high enough to drop the hydraulic static pressure in the neck section below the gas pressure in gas space 12. Thus the gas can be entrained into the narrow neck section.

Figure 4:
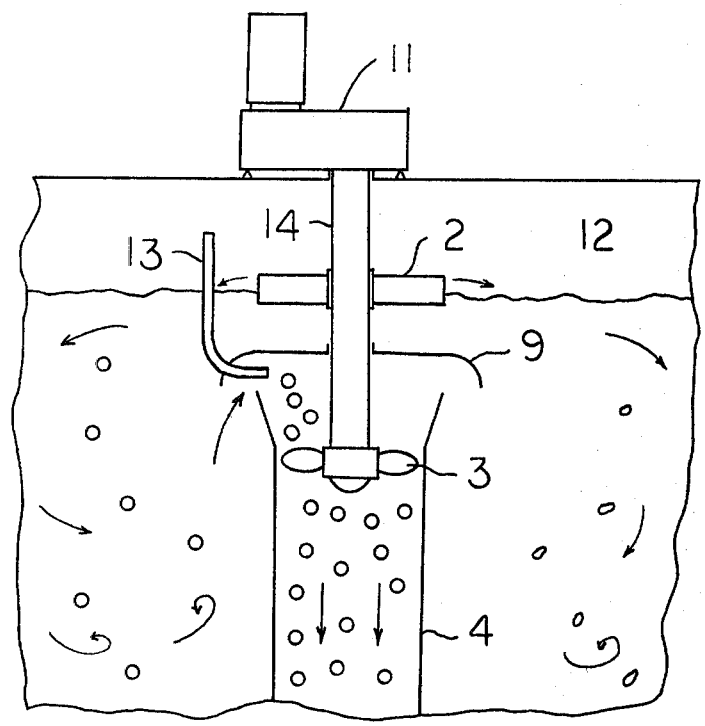

In FIG. 4, other arrangement of gas entrainment tube 13 is shown where one end of the tube 13 is open to the gas space 12 and the other end is open to the flow in guide tube 4 facing downstream so that theopening is in the wake region formed by the entrainment tube itself.

Figure 5:
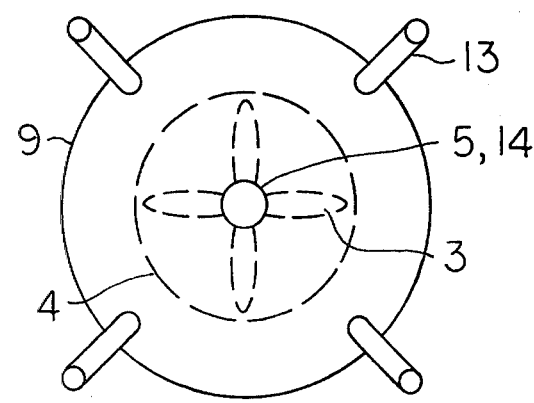

In FIG. 5, the cover 9 is shown.

The functional operation may be explained first with reference to FIG. 1. The surface aerator 2 rotates near the liquid surface creating surface disturbances, sprays and overall flow circulation. Simultaneously the impeller 3 rotates pumping flow downward through the guide tube 4, which subsequently creates low pressure region near the exit gas holes on arm 7. The low pressure is also created by the wake formed behind the rotating arm 7 itself. This low pressure region near the holes on arm 7 entrains gas from the gas space 12 above through the hollow portion of the shaft 5. The entrainment is thus achieved by self-aspiration mechanism. Then the entrained gas is sheared by the impeller 3 and pushed downward mixed with liquid. The surface aerator 2 and the down pumping impeller 3 are driven by a power supply unit 11.

In FIG. 3, the basic operation is the same as described in FIG. 1 except that the gas aspiration is achieved by tube 13 where the pressure difference between the two open end, namely the one opening in gas space and the other in liquid flow, is created by Venturi effect. This effect can easily be estimated by applying the well known Bernoulli's equation.

In FIG. 4, the basic operation is again the same as in FIG. 1 except that the wake of the tube 13 submersed in liquid flow region in guide tube 4 creates low pressure region near the opening of the tube in liquid flow. This low pressure subsequently sucks in gas from the gas space through the tube 13.

As illustrated in FIGS. 1,3 and 4, the gas liquid mixture is pushed down through the guide tube 4, and then discharged near the bottom of the basin 1. This discharge mechanism creates high bottom scouring action thus making solids suspended in typical wastewater. The gas bubbles thus released near the bottom mix with the rest of the turbulent fluid, then the small and large eddies of turbulence and gas bubbles interact violently resulting in high gas absorption rate at the expense of already existing and dissipative turbulent kinetic energy. In other words the interaction between gas bubbles and turbulent eddies does not require additional energy input while the interaction promotes mass transfer. Consequently the power requirement to achieve a fixed amount of mass transfer rate of the gas into the liquid becomes very much smaller than by the surface action only. Moreover since the liquid basin depth can be made relatively deeper than typical surface aeration, the overall driving force for gas liquid mass transfer is larger than the one in the case of surface aeration only, where the gas liquid contacting is done mainly on or near the liquid surface. From all these reasoning, the present invention is based on novel concept of interacting mechanism of surface agitation and aspirated gas bubbles utilizing liquid turbulence which is naturally produced by agitation and is highly dissipative. Consequently the present invention effectively utilizes energy input.

Although I have descirbed my invention with a certain degree of particularity, it is understood that the present disclosure has been made only by way of examples and that numerous change in details of construction and the combination and arrangement of parts may be resorted without departing from the basic spirit and the scope of the invention as hereafter claimed as new and thus desire to be secured by Letters of Patent.

I claim:

1. An apparatus for aerating liquid, especially wastewater located in a basin, comprising a basin containing the liquid defining a free surface above which a gas space filled with oxygen mixture is provided, a vertically disposed shaft, means operatively connected for rotating said shaft about a substantially vertical axis, a rotatable surface aeration device mounted on said shaft and immersible into said liquid for circulating and aerating said liquid near the surface, a flow guide tube vertically disposed and extending upwardly from a point just above the basin floor to a level just below said surface aerator, said guide tube surrounding said shaft and defining an inlet region at its top end thereof, at least one down pumping impeller disposed in said guide tube and mounted on said shaft for creating a downward flow in said guide tube, at least one gas conduit for communicating said gas space above the liquid surface with the inlet region of said guide tube, restriction means for guiding flow of liquid into the inlet region, said restriction means located between the surface aerator and the top end of said guide tube, wherein said downward flow creates a low pressure in said inlet region of said guide tube so that the oxygen mixture is entrained therein by self-aspiration through said gas conduit, and the mixture of entrained gas and liquid thusly formed and traveling downwardly in said guide tube is discharged at its lower end into said basin.

2. An apparatus as claimed in claim 1 further comprises gas flow regulating means connected to said gas conduit for controlling gas flow rate into said guide tube.

3. An apparatus for aerating a liquid, especially wastewater located in a basin, comprising a basin containing the liquid defining a free surface above which a gas space filled with oxygen mixture is provided, a vertically disposed hollow shaft, means operatively connected for rotating said shaft about a substantially vertical axis, a rotatable surface aeration device mounted on said shaft and immersible into said liquid for circulating and aerating said liquid near the surface, a flow guide tube vertically disposed and extending upwardly from a point just above the basin floor to a level just below said surface aerator, said guide tube surrounding said shaft and defining an inlet region at its top end thereof, at least one down pumping impeller disposed in said guide tube and mounted on said shaft for creating a downward flow in said guide tube, said hollow shaft providing a passageway for communicating said gas space above the liquid surface with the inlet region of said guide tube, restriction means for guiding flow of liquid into the inlet region, said restriction means located between the surface aerator and the top end of said guide tube, wherein said downward flow creates a low pressure in said inlet region of said guide tube so that the oxygen mixture is entrained therein by self-aspiration through said passageway, and the mixture of entrained gas and liquid thusly formed and traveling downwardly in said guide tube is discharged at its lower end into said basin.

4. The apparatus as claimed in claim 3, wherein the passageway extends horizontally from the hollow shaft and further comprises a plurality of small openings, wherein, through said tube, entrained oxygen mixture is distributed radially from the center of said rotating shaft.

* * * * *